Feb. 27, 1962 W. E. MALEK 3,022,767
AUTOMATIC FISH FEEDERS
Filed May 27, 1959
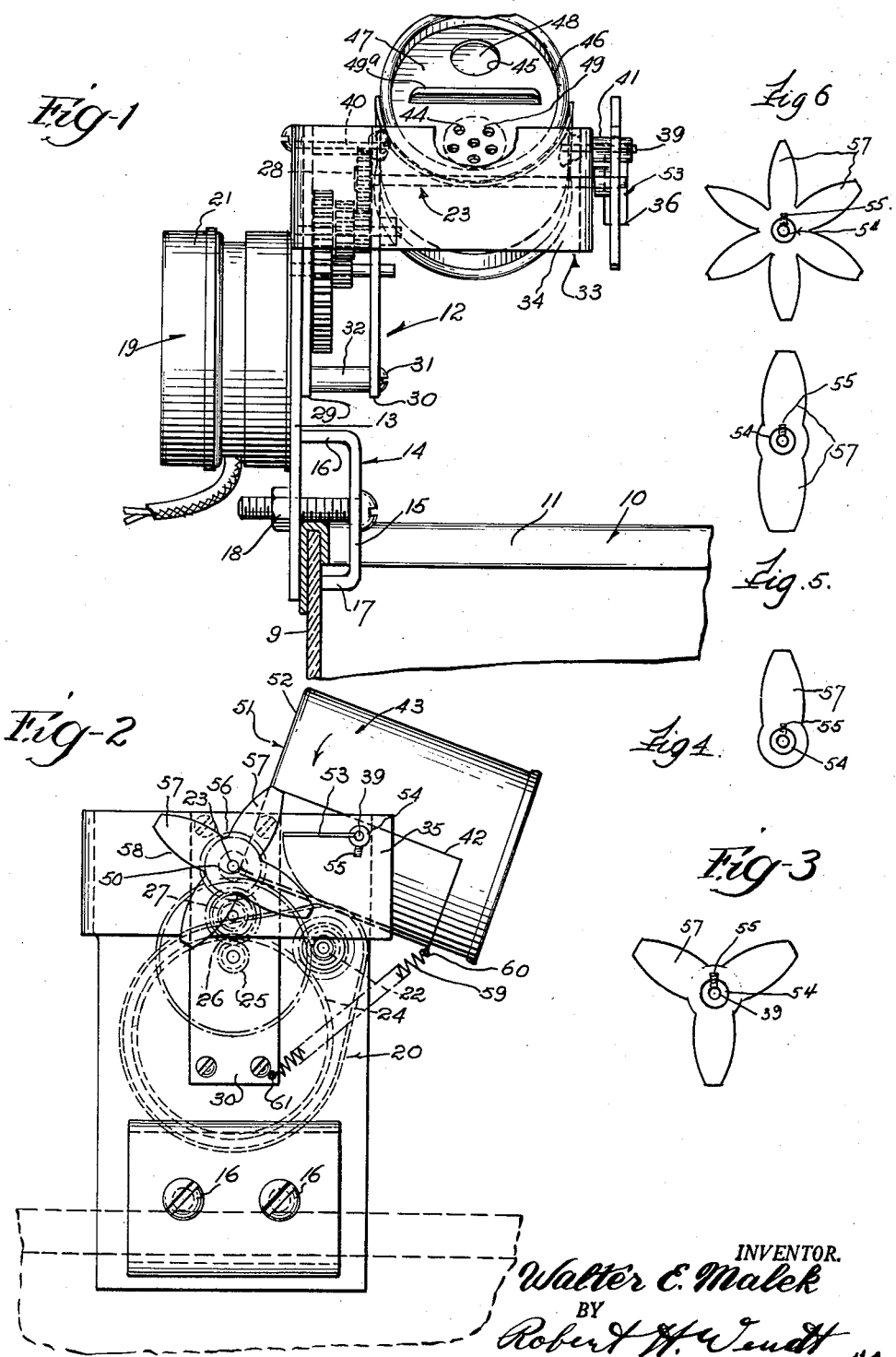
INVENTOR.
Walter E. Malek
BY
Robert W. Wendt

United States Patent Office 3,022,767
Patented Feb. 27, 1962

3,022,767
AUTOMATIC FISH FEEDERS
Walter E. Malek, 5603 S. Elizabeth St., Chicago, Ill., assignor of one-third to Robert H. Wendt, Evanston, Ill.
Filed May 27, 1959, Ser. No. 816,145
5 Claims. (Cl. 119—51.11)

The present invention relates to automatic fish feeders, and is particularly concerned with the provision of a time controlled device for automatically dispensing a predetermined amount of fish food from a standard canister into an aquarium at regular periods of time and in regular amounts determined by the user.

One of the objects of the invention is the provision of a dependable fish food dispenser which uses a standard fish food canister and in which the flow of fish food and the time intervals for dispensing it may be easily adjusted and the supply of fish food may be readily renewed.

Another object of the invention is the provision of an improved fish food dispenser in which the canister moves with a snap action back to the non-dispensing position, shaking up the contents in such manner as to eliminate any possibility of caking or clogging of the fish food.

Another object of the invention is the provision of an improved fish food dispenser which is simple in construction, which has a minimum number of parts, which has a spring saddle for gripping a standard canister of fish food, which is positive in its action, and which keeps the fish food loose, and the openings clear, and which may be manufactured at a low cost so that it may be placed within the means of a vast number of purchasers.

Other objects and advantages of the invention will be apparent from the following description and the accompanying drawings, in which similar characters of reference indicate similar parts throughout the several views.

Referring to the single sheet of drawings accompanying this specification,

FIG. 1 is a front elevational view of an automatic fish feeder embodying the invention, attached to the upper edge of an aquarium, a portion of which is shown in section, with the fish food container in the non-dispensing position;

FIG. 2 is a side elevational view taken from the right of FIG. 1, and showing the parts in the same position;

FIG. 3 is an elevational view of another form of star wheel for dispensing food three times a day;

FIG. 4 is a similar view of an actuating wheel having a single lug;

FIG. 5 is a similar view of another actuating wheel having two lugs;

FIG. 6 is a similar view of an actuating wheel having six lugs.

Referring to FIGS. 1 and 2, 10 indicates in its entirety an aquarium, comprising a tank, only a portion of which is shown usually provided with at least one transparent wall 9 and having a channelled metal covering 11 extending around the top edge of the tank. The channel 11 may be used for supporting the fish food dispenser, which is indicated in its entirety by the numeral 12.

The dispenser may be carried by a plate 13 of metal or plastic, having a U-shaped clamping member 14, the yoke 15 of which is provided with a pair of apertures for the screw bolts 16. The clamping member 14 has one flange 16 which is longer so that it bears on the surface of the plate 13 when the other shorter flange 17 bears against the inside of the tank 10, when the clamp is in position, as shown in FIG. 1.

The screw bolts 16 have their heads bearing on the yoke 15 and extend through apertures in the plate 13 and are provided with nuts 18, drawing the clamping member 14 into tight engagement with the tank and securing the fish feeder on the tank.

The feeder assembly preferably includes a synchronous clock motor 19 of the type having an attached gear housing 20 extending laterally from one end of the cylindrical housing 21; and the motor is preferably a synchronous electric motor driven by 110 volt A.C. so that it may be connected by a standard cord and plug to a lighting circuit for timing the feeder.

The motor is preferably of the self starting type; and it has a driven shaft 22 projecting from the side of the gear housing 20 and carrying a pinion.

The feeder assembly is preferably provided with additional reducing gears of such size and relation that the clock driven shaft 23 rotates once each twenty-four hours.

Thus the pinion 22 drives a spur gear 24, which is secured to a pinion 25, which drives a spur gear 26 secured to a second pinion 27, driving a spur gear 28 on the driven shaft 23, which I call the timed driven shaft.

Various types of reduction gears may be employed; but they are preferably mounted between a pair of metal plates 29 and 30, which are secured together and secured to the plate 13 by screw bolts 31 located at each end and provided with spacers 32 and nuts.

The various gears have shafts which extend into bearing apertures in the plates 29, 30. The supporting plate 13 is preferably provided with a U-shaped extension 33 having a laterally extending yoke 34 and a parallel flange 35 for supporting the driven shaft 23 in a suitable bearing aperture.

At one end the timed driven shaft 23 carries the pinion or gear 28; and at the other end, outside the flange 35, shaft 23 carries a star wheel 36, which may be any of the star wheels in FIGS. 1-6.

The driven shaft 23 preferably has its end portion, on which the star wheel is mounted, knurled so that the star wheel may be adjustably gripped by a set screw 37, which is threaded into hub 38 in any adjusted position.

The plate 13 and the parallel flange 35 preferably support a second oscillating shaft 39, which has its ends rotatably mounted in apertures in the plate 13 and flange 35; and the oscillating shaft 39 is preferably made in two sections 40 and 41 soldered or otherwise secured to a resilient sheet metal saddle for gripping a standard canister 43 of fish food.

The saddle 42 comprises a resilient half cylindrical metal member which may extend slightly beyond a half cylinder for gripping and holding the cylindrical canister 43, which slides into or out of the saddle 42 when sufficient pressure is exerted on these parts.

The saddle 42 has its outer sides soldered or brazed to the inner ends of the shaft sections 40 and 41 to oscillate with the shaft.

In FIGS. 1 and 2 the saddle and canister are shown in the non-dispensing position with the dispensing apertures 44, 45 in the uppermost position.

The fish food canister 43 may be of any standard type, such as a plastic cylindrical container having a flange 46 overlying a rotatable end wall 47 in the canister, the end wall being provided with the apertures 44, 45, previously mentioned. The rotatable end wall 47 over-lies a fixed end wall 48, which is seen through the aperture 45, and which has a fixed aperture 49 with which any of the apertures 45 and 46 may be made to register.

The rotatable end wall 47 has a projecting rib 49 for grip with the fingers so that the apertures 44, 45 may be rotated into such position that they are closed by the fixed wall 48, or any of the apertures may be rotated to the open position to adjust the amount of flow of fish food when the canister is turned with its dispensing end downward.

The canister has sufficient food for many feedings; and the food is of a powdered or granular nature, so that it can pass out of one or more of the apertures 44 or a part of the large aperture 45; and the amount of food may be adjusted so that one shake or movement into the dispensing position is sufficient for one feeding.

The supply of food may be renewed at any time by renewing the old empty canister and substituting a new one; and the rest of the canister is closed except for the apertures mentioned, so that the food is kept in good condition.

The saddle 42 is of such length that its left lower corner 50 strikes the time driven shaft 23 with the dispensing end 51 of the canister upward, preventing further rotation of the end 51 upward, but permitting its tilting in a clockwise direction, as shown in FIG. 2.

The saddle and canister may rotate downward with the end 51 when actuated to such a position that the upper corner 52 of the canister strikes the shaft 23; and the shaft 23 is thus adapted to serve as a stop member and a device for striking a blow by the shaft against the canister for ejecting a measured amount of fish food from the canister when the end 51 is downward.

The amount of movement in an oscillating manner of the canister 43 is strictly limited, since it is only necessary to move the canister from the upward position, with the end 51 generally upward, to the dispensing position when this end is turned downward.

In both of these positions the canister is tilted, as it is not necessary for it to be moved to fully vertical position. The oscillating shaft 39 is provided at its right end in FIG. 1 with an actuating vane 53, which may be of metal or plastic, but which preferably has a hub 54 with an aperture fitting on the knurled end of shaft 39 and secured by a set screw 55 in any adjusted position.

The length of the vane 53 is such that it passes freely through the circular portion of star wheel 36 at the grooves 56 between the lugs 57 of the star wheel.

The lugs 57 preferably have convex arcuate side walls 58; and the lugs 57 may be relatively thin, since the vane 53 is relatively wide, so that it always engages a lug.

The star wheel 36 may have four lugs 57, as shown in FIG. 2; and since the timed shaft 23 rotates once each twenty-four hours, a lug 57 will engage the vane 53 once every six hours.

Various forms of star wheels may be employed, such as that shown in FIG. 3, with three lugs 57, that shown in FIG. 4 with one lug, in FIG. 5 with two lugs, FIG. 6 with six lugs, or any desired number of lugs.

The star wheels or lug wheels are interchangeable; and thus the user may adjust the fish feeder to deposit fish food in the tank at almost any desired period of time.

The saddle 42 is urged in a counterclockwise direction by means of a light spring 59, having one end hooked in an aperture in the saddle at 60 and the other end hooked in an aperture in the plate 30 at 61. The spring is weak enough so that the timing clock 19 can actuate the star wheel 36 in a clockwise direction against the tension of spring 59 as the clock motor rotates; and one of the lugs 57 will engage the vane 53, causing the vane to rotate counterclockwise in FIG. 2 until the dispensing end 51 of the canister 43 strikes the shaft 23 at the point 52 on the canister.

The jar is sufficient to shake out the measured amount of fish food out of the apertures 44 or 45, one of which is arranged lowermost in the saddle 42.

When the lug 57, which is driving the vane 53, passes the vane 53, the vane is released and the saddle snaps back to the position of FIG. 2, throwing the contents of the canister 43 away from the openings to minimize caking and clogging by shaking up the fish food.

Thus the fish may be fed at regular intervals; and provision having already been made in the aquarium 10 for filtering and aeration of the water, the fish will need no attention for a relatively long period of time, such as a vacation of the owner.

The regular feeding of the fish is also assured at regular intervals day by day so that it will not be forgotten; and this is very important to the fish owners, as the well-being and existence of the fish, which are often expensive, depends on regular feeding.

It will thus be observed that I have invented an improved automatic fish feeder which is simple in construction and has a minimum number of parts, but is dependable in its operation and adapted to be manufactured at a low cost so that it may be widely used by owners of fish.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. An automatic time controlled fish feeding assembly, comprising, a supporting plate, clamping means carried by said supporting plate and having threaded means urging the clamping means into engagement with the said plate, a synchronous clock motor assembly carried by said plate and adapted to be driven by standard A.C. house lighting energization, said motor driving a driven shaft, an oscillating shaft rotatably mounted on said plate, a standard fish food canister containing comminuted fish food and having adjustable fish food dispensing openings in its end, a canister clamping saddle carried by said oscillating shaft, stop means comprising a part of said driven shaft located on said plate for stopping the oscillating shaft and canister with its dispensing openings in the upward position, a star wheel on said driven shaft, and a radial vane on said oscillating shaft, said star wheel having a lug engaging and passing by and releasing the vane on the oscillating shaft for moving said canister to the dispensing position, and thereafter permitting the canister to return to upward position.

2. An automatic fish feeder according to claim 1, in which the canister also strikes said stop means in its dispensing position for jarring the canister and accomplishing the discharge of fish food.

3. An automatic fish feeder according to claim 2, in which the star wheel is provided with a plurality of lugs for accomplishing the feeding a plurality of times during one rotation of the first shaft.

4. An automatic fish feeder according to claim 1, in which the oscillating shaft is formed with a partially cylindrical canister holding saddle which is adapted to embrace and removably support a complementary standard canister.

5. An automatic fish feeder according to claim 1, in which the oscillating shaft is urged against one of its stops by a coil spring jarring the canister upon its return to the other position for loosening the fish food in the canister.

References Cited in the file of this patent

UNITED STATES PATENTS

| | | |
|---|---|---|
| 846,256 | Smith | Mar. 5, 1907 |
| 2,339,396 | Harvey | Jan. 8, 1944 |
| 2,725,852 | Cramer | Dec. 6, 1955 |
| 2,847,066 | Kleiber et al. | Aug. 12, 1958 |
| 2,869,638 | Sullivan | Jan. 10, 1959 |

FOREIGN PATENTS

| | | |
|---|---|---|
| 654,113 | Great Britain | June 6, 1951 |